(12) United States Patent
Zhuang et al.

(10) Patent No.: US 11,333,808 B2
(45) Date of Patent: May 17, 2022

(54) LIGHT FILTERING ASSEMBLY USED IN A LENS MODULE

(71) Applicant: CONCRAFT HOLDING CO., LTD., Grand Cayman (KY)

(72) Inventors: Yankui Zhuang, Kunshan (CN); Heng Yang, Kunshan (CN)

(73) Assignee: DRAGONSTATE TECHNOLOGY CO., LTD., New Taipei (TW)

( * ) Notice: Subject to any disclaimer, the term of this patent is extended or adjusted under 35 U.S.C. 154(b) by 344 days.

(21) Appl. No.: 16/429,518

(22) Filed: Jun. 3, 2019

(65) Prior Publication Data

US 2020/0284955 A1 Sep. 10, 2020

(30) Foreign Application Priority Data

Mar. 5, 2019 (TW) .................................. 108107175

(51) Int. Cl.
| | |
|---|---|
| *F21V 9/04* | (2018.01) |
| *F21V 9/06* | (2018.01) |
| *G02B 5/08* | (2006.01) |
| *G02B 5/20* | (2006.01) |
| *G02B 7/02* | (2021.01) |

(52) U.S. Cl.
CPC ................. *G02B 5/20* (2013.01); *G02B 7/02* (2013.01)

(58) Field of Classification Search
None
See application file for complete search history.

(56) References Cited

U.S. PATENT DOCUMENTS

2014/0286017 A1 * 9/2014 Morgan .............. H01L 31/0687
362/308
2018/0321463 A1 * 11/2018 Staley .................. G02B 7/1828

FOREIGN PATENT DOCUMENTS

TW I366737 B 6/2012

* cited by examiner

*Primary Examiner* — Darryl J Collins
*Assistant Examiner* — Tamara Y. Washington
(74) *Attorney, Agent, or Firm* — Muncy, Geissler, Olds & Lowe, PC

(57) ABSTRACT

A light filtering assembly is installed in a lens module, including a fixed mount having a hollow part, a light filter at the hollow part, a shutter annularly disposed on the light filter, and a binding element. The hollow part is annularly formed by a support part extending from the fixed mount toward the hollow part. A first binding space is formed between the support part and the fixed mount, extending the outer periphery of the light filter and the shutter into the first binding space. An adhesive material is injected into the first binding space, and is then cooled down to form the binding element in the first binding space, so as to stop the light filter and the shutter at the hollow part as well as fix the light filter and the shutter on the fixed mount.

8 Claims, 5 Drawing Sheets

LIGHT FILTERING ASSEMBLY USED IN A LENS MODULE

BACKGROUND OF THE INVENTION a) Field of the Invention

The present invention relates to a light filtering assembly, and more particularly to a light filtering assembly which is used in a lens module to improve the assembling efficiency of the lens module and reduce the labor cost significantly.

b) Description of the Prior Art

A light filter is installed primarily in a lens module to filter the light, thereby ensuring that the lens module is provided with a good imaging quality. A conventional light filter is adhered on a spacer through a spot gluing device. However, for the conventional spot gluing method, due to the deterioration of glue, the non-homogeneity in coating or the incompleteness of solidification, the adhesive power between the light filter and the spacer will be inferior, which results in the peeling between the light filter and the spacer to fail the lens module and decrease the yield of production.

In addition, a Taiwanese Invention Patent Publication No. I366737 discloses a lens module. The lens module includes a lens cone as well as a light filter and a spacer that are disposed in the lens cone. The light filter and the spacer are formed integrally, and as the light filter and the spacer are formed integrally, the light filter can be fixed on the spacer stably without escaping from the spacer, which eliminates the spot gluing procedure between the light filter and the spacer, thereby improving the yield of production of the lens module.

For the abovementioned patent, the light filter will not escape from the spacer. However, as the spacer is formed directly on the periphery of the light filter by injection molding, when the light filter is emplaced in an injection mold, a certain clamping force has to be exerted onto the light filter through the injection mold to avoid the flash of plastic in the injection mold. Therefore, the light filter will be cracking easily in the injection mold. Furthermore, during the cooling process of plastic, the spacer can be deformed easily by the cooling, which results in the shifting of the spacer when the spacer is assembled in the lens module, thereby affecting the imaging quality of the lens module.

Accordingly, how to provide a light filtering assembly that can improve the assembling efficiency of the lens module and reduce the labor cost significantly is the issue to be solved by the present invention.

SUMMARY OF THE INVENTION

The primary object of the present invention is to provide a light filtering assembly, and more particularly to a light filtering assembly which is used in a lens module to improve the assembling efficiency of the lens module and reduce the labor cost significantly.

To achieve the aforementioned object, the present invention discloses a light filtering assembly used in a lens module, comprising a fixed mount, a light filter, a shutter and a binding element. A center of the fixed mount is provided with a hollow part which is formed annularly by a support part extending from the fixed mount toward the hollow part. A first binding space is formed between the support part and the fixed mount. The light filter is disposed at the hollow part of the fixed mount and is supported by the support part. In addition, the outer periphery of the light filter is extended into the first binding space. An adhesive material is injected into the first binding space and is then cooled down to form the binding element in the first binding space, so as to stop the light filter and the shutter at the hollow part as well as fix the light filter and the shutter on the fixed mount.

In an embodiment, the adhesive material is silicone gel.

In an embodiment, the support part is further provided with a supporting platform, and the light filter is loaded on the supporting platform.

In an embodiment, the supporting platform is further concaved with a second binding space which further includes an auxiliary binding element to bind the light filter with the supporting platform.

In an embodiment, the auxiliary binding element is formed by pre-injecting an adhesive material into the second binding space, followed by loading the light filter on the support part and then being formed in the second binding space after cooling, so that the light filter can be pre-positioned on the support part through the auxiliary binding element.

In an embodiment, the adhesive material is silicone gel.

In an embodiment, the binding element is provided with a binding slot which is annularly disposed on the outer periphery of the light filter and the shutter respectively, with the outer periphery of the light filter and the shutter being enclosed by the binding slot.

In an embodiment, the binding slot is formed further by a first binding surface, a second binding surface which is opposite to the first binding surface, and a third binding surface which is connected between the first binding surface and the second binding surface.

In an embodiment, the first binding surface is disposed on a side of the light filter having the shutter, and is interconnected with part of the light filter as well as part of the shutter.

In an embodiment, the second binding surface is disposed on the other side of the light filter that is opposite to the shutter, and is interconnected with part of the light filter.

In comparison to the prior art, the light filtering assembly of the present invention, is provided with following advantages:

1. Through the binding element, the light filter and the shutter are fixed on the fixed mount at a same time, allowing the light filtering assembly to be formed integrally. Therefore, the light filtering assembly can be quickly installed in the lens module.
2. As the light filter and the shutter are interconnected with the fixed mount through the binding element, the issue in the prior art that the fixed mount is deformed by shrinking when the fixed mount is formed on the light filter by injection molding can be avoided, which improves the yield of production of the light filtering assembly significantly.

DETAILED DESCRIPTION OF THE PREFERRED EMBODIMENTS

Figure 1:
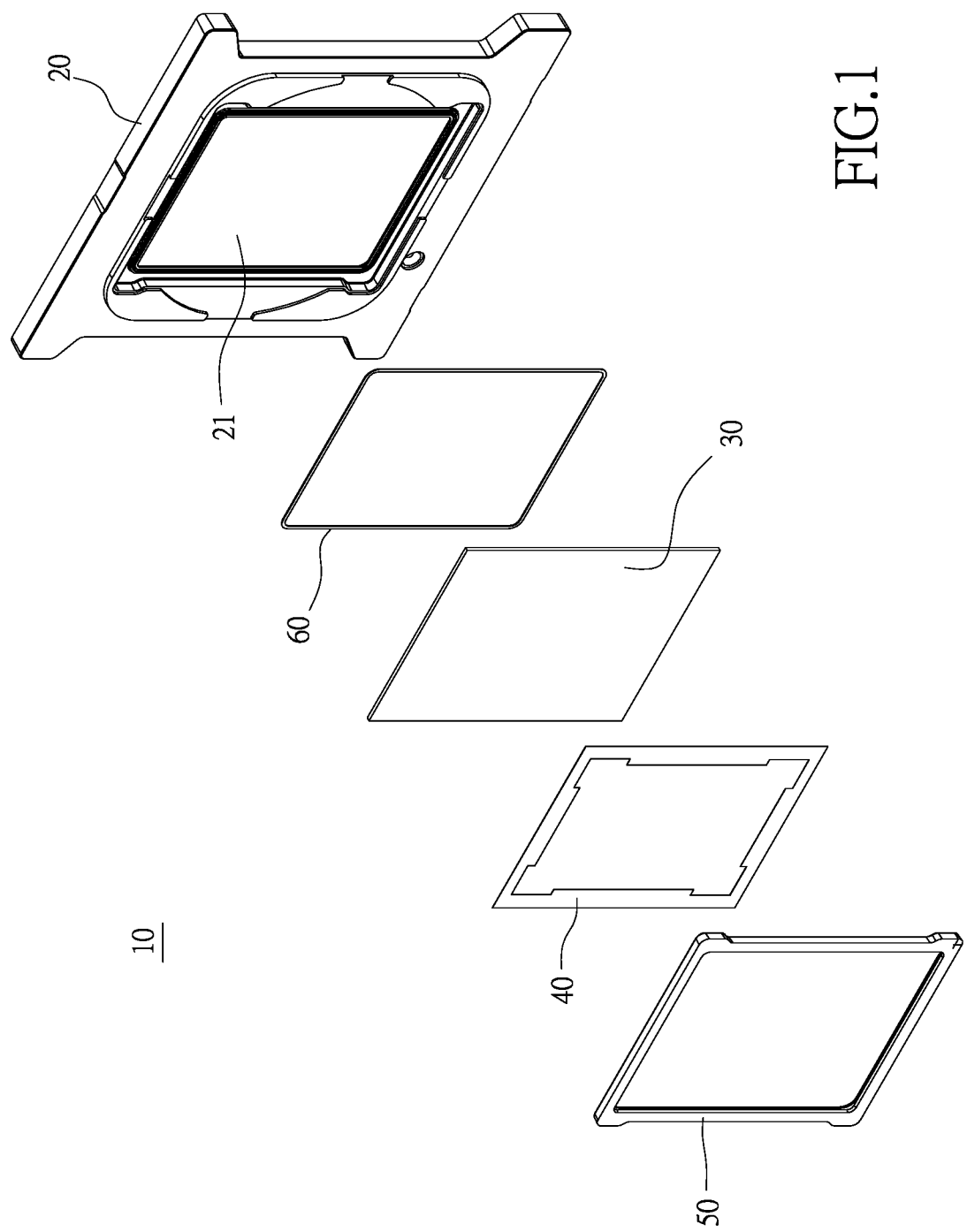
FIG. 1 shows a three-dimensional exploded view of the present invention at a first viewing angle.
Figure 2:
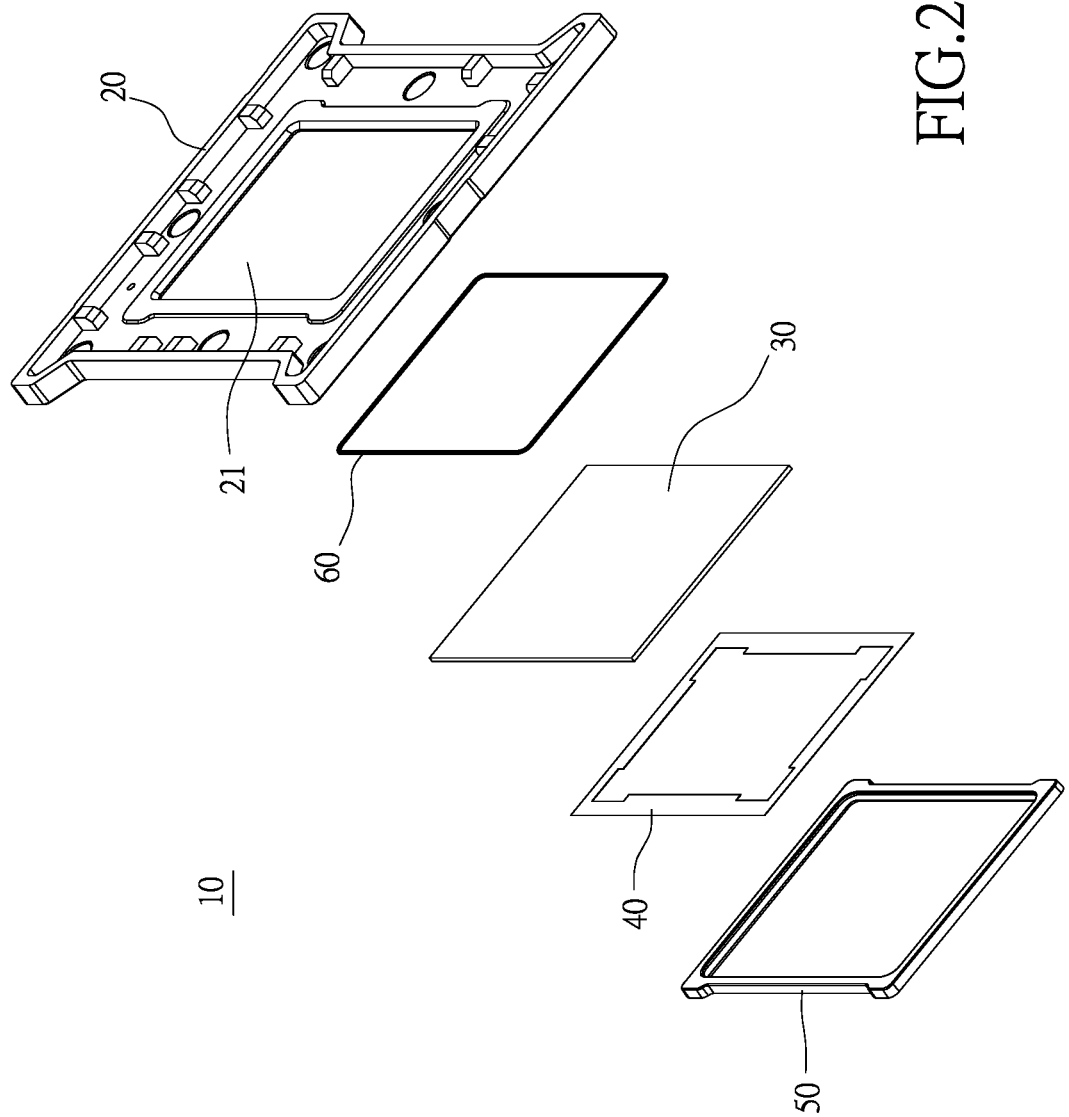
FIG. 2 shows a three-dimensional exploded view of the present invention at a second viewing angle.
Figure 3:
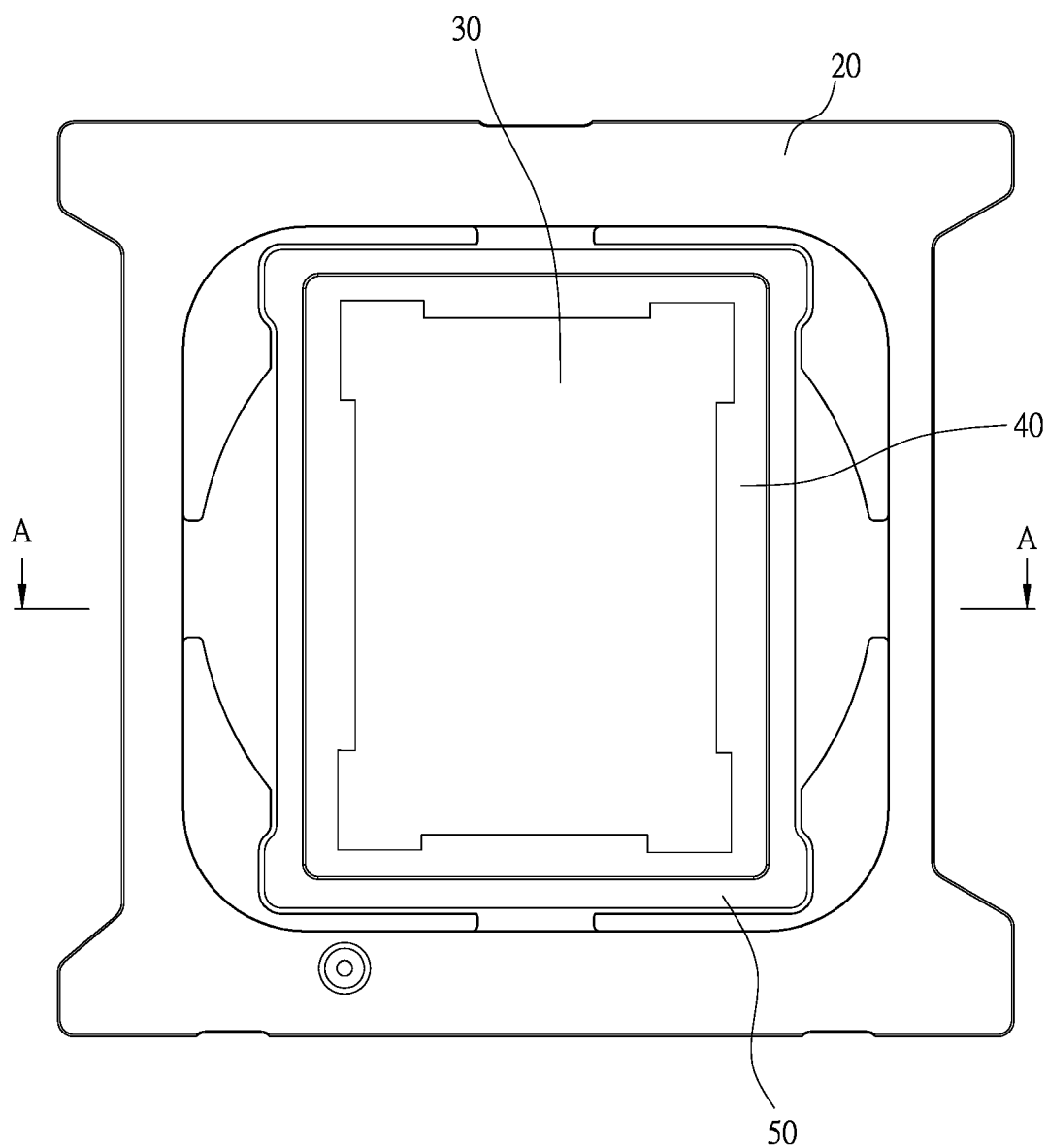
FIG. 3 shows a planar exploded view of the present invention.
Figure 4:
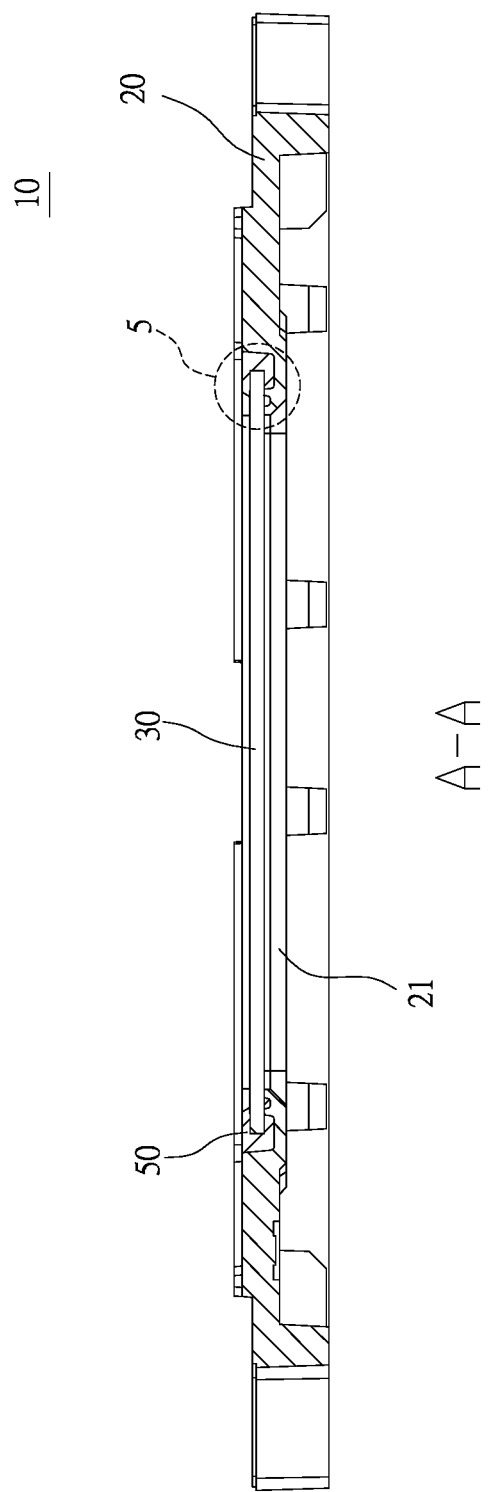
FIG. 4 shows a cutaway view of FIG. 3.
Figure 5:
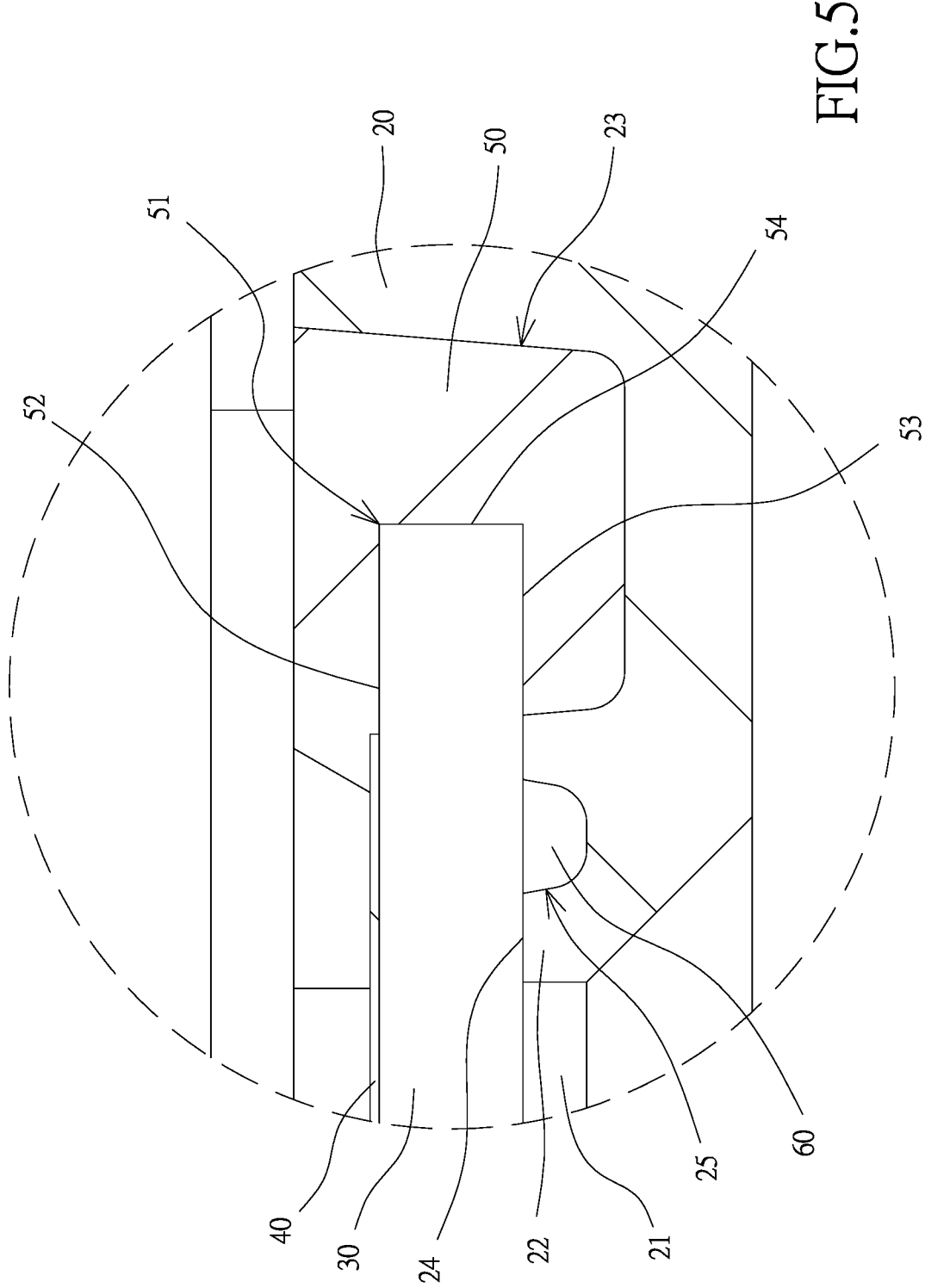
FIG. 5 shows a locally enlarged view of FIG. 4.

Referring to FIGS. 1 to 5, the present invention discloses a light filtering assembly 10 that is used in a lens module. The light filtering assembly 10 comprises a fixed mount 20, a light filter 30, a shutter 40, a binding element 50 and an auxiliary binding element 60.

The fixed mount 20 is formed by injection molding to a plastic material, and a center of the fixed mount 20 is provided with a hollow part 21. The hollow part 21 is annularly formed by a support part 22 which is extended from the fixed mount 20 toward the hollow part 21; whereas, a first binding space 23 is formed between the support part 22 and the fixed mount 20. In addition, the support part 22 is further formed with a supporting platform 24 which is provided with a second binding space 25.

The light filter 30 is installed on the hollow part 21 and is loaded on the supporting platform 24 of the support part 22. The outer periphery of the light filter 30 is extended into the first binding space 23.

The shutter 40 is in an annular shape and is disposed on the light filter 30, opposite to the support part 22. The outer periphery of the shutter 40 is extended into the first binding space 23.

The binding element 50 is formed by injecting an adhesive material into the first binding space 23, followed by being cooled down. Therefore, the binding element 50 will enclose the outer periphery of the light filter 30 and the shutter 40 in the first binding space 23 at a same time. As the binding element 50 is adhesive, when the binding element 50 is formed in the first binding space 23, the light filter 30 and the shutter 40 can be interconnected with the fixed mount 20 effectively, and the light filter 30 can be disposed at the hollow part 21 effectively.

The auxiliary binding element 60 is formed by pre-injecting an adhesive material which is the same as the binding element 50, into the second binding space 25; therefore, when the light filter 30 is loaded on the support part 22, the light filter 30 can be pre-loaded on the support part 22 stably, avoiding that the light filter 30 shifts on the support part 22 while forming the binding element 50.

In practical operation of the present embodiment, the fixed mount 20 is first formed by injection molding, and then the fixed mount 20 is emplaced in a lower die shoe (not shown in the drawings), followed by injecting an adhesive material into the second binding space 25 of the fixed mount 20. Next, the light filter 30 and the shutter 40 are emplaced in the hollow part 21 orderly, so that the light filter 30 can be loaded on the supporting platform 24 to be interconnected with the support part 22, thereby being able to be pre-positioned on the support part 22. After that, an upper die shoe (not shown in the drawings) is covered on the lower die shoe, and then an adhesive material is injected into a space between the upper die shoe and the lower die shoe, so that the adhesive material can be filled in the first binding space 23. After the adhesive material is cooled down in the first binding space 23 and the second binding space 25, the binding element 50 can be formed in the first binding space 23, and the auxiliary binding element 60 can be formed in the second binding space 25. Finally, the formed light filtering assembly 10 is taken out of the space between the upper die shoe and the lower die shoe.

It is worth of mentioning that the abovementioned adhesive material is primarily silicone gel, as the silicone gel is characterized in high adhesiveness and low melting point. Before the silicone gel is injected into the first binding space 23 and the second binding space 25, it is heated to the liquid state to facilitate injecting into the first binding space 23 and the second binding space 25. As the silicone gel is characterized in low melting point, the fixed mount 20 will not be melting, nor will be deformed. On the other hand, after the silicone gel is cooled down and formed, the light filter 30 and the shutter 40 can be assured to be kept on the fixed mount 20 effectively and stably, thereby improving the yield of production of the light filtering assembly 10.

Furthermore, after the binding element 50 is formed in the first binding space 23, the binding element 50 will be formed with a binding slot 51 which is annularly disposed at the outer periphery of the light filter 30 and the shutter 40. The binding slot 51 encloses the outer periphery of the light filter 30 and the shutter 40, including a first binding surface 52, a second binding surface 53 which is opposite to the first binding surface 52, and a third binding surface 54 which is connected between the first binding surface 52 and the second binding surface 53. The first binding surface 52 is disposed on a side of the light filter 30 having the shutter 40, and is interconnected with part of the light filter 30 and part of the shutter 40. On the other hand, the second binding surface 53 is disposed on the other side of the light filter 30 and is interconnected with part of the light filter 30, so as to ensure that the light filter 30 and the shutter 40 can be adhered on the fixed mount 20 stably.

Accordingly, a high yield of production can be achieved for the light filtering assembly, and when the light filtering assembly is installed in a lens module (not shown in the drawings), the peeling between the light filter and the fixed mount can be prevented effectively, thereby enabling the lens module to achieve a good imaging quality and improving the lifetime of use of the lens module.

It is of course to be understood that the embodiments described herein is merely illustrative of the principles of the invention and that a wide variety of modifications thereto may be effected by persons skilled in the art without departing from the spirit and scope of the invention as set forth in the following claims.

What is claimed is:

1. A light filtering assembly used in a lens module, comprising:
   a fixed mount, a center of which is provided with a hollow part, with the hollow part being formed annularly by a support part extending from the fixed mount toward the hollow part, and a first binding space being formed between the support part and the fixed mount;
   a light filter, which is disposed at the hollow part of the fixed mount and is supported by the support part, with an outer periphery of the light filter being extended into the first binding space;
   a shutter, which is in an annular shape and is disposed on a side of the light filter opposite to the support part, with an outer periphery of the shutter being extended into the first binding space; and
   a binding element formed by an adhesive material in the first binding space for stopping the light filter and the shutter at the hollow part as well as fixing the light filter and the shutter on the fixed mount,
   wherein the support part is further provided with a supporting platform, and the light filter is loaded on the supporting platform, and
   wherein the supporting platform is further concaved with a second binding space, and an interior of the second binding space is further provided with an auxiliary binding element to bind the light filter with the supporting platform.

2. The light filtering assembly used in a lens module, according to claim 1, wherein the adhesive material is silicone gel.

3. The light filtering assembly used in a lens module, according to claim 1, wherein the auxiliary binding element is formed by pre-injecting an adhesive material into the second binding space, followed by loading the light filter on the support part and then being formed in the second binding space after cooling, allowing the light filter to be pre-positioned on the support part through the auxiliary binding element.

4. The light filtering assembly used in a lens module, according to claim 3, wherein the adhesive material is silicone gel.

5. The light filtering assembly used in a lens module, according to claim 1, wherein the binding element is provided with a binding slot which is annularly disposed on the outer periphery of the light filter and the shutter respectively, with the outer periphery of the light filter and the shutter being enclosed by the binding slot.

6. The light filtering assembly used in a lens module, according to claim 5, wherein the binding slot is formed further by a first binding surface, a second binding surface which is opposite to the first binding surface, and a third binding surface which is connected between the first binding surface and the second binding surface.

7. The light filtering assembly used in a lens module, according to claim 6, wherein the first binding surface is disposed on a side of the light filter having the shutter, and is interconnected with part of the light filter and part of the shutter.

8. The light filtering assembly used in a lens module, according to claim 6, wherein the second binding surface is disposed on an other side of the light filter opposite to the shutter, and is interconnected with part of the light filter.

* * * * *